United States Patent

Hosokawa et al.

Patent Number: 5,845,221
Date of Patent: Dec. 1, 1998

[54] LOAD CONTROL SYSTEM FOR VEHICLE

[75] Inventors: Kiyoshi Hosokawa, Tokyo; Yoshinori Ikuta; Nobuhiro Imaizumi, both of Shizuoka, all of Japan

[73] Assignee: Yazaki Corporation, Tokyo, Japan

[21] Appl. No.: 675,295

[22] Filed: Jul. 1, 1996

[30] Foreign Application Priority Data

Jun. 30, 1995 [JP] Japan ................................. 7-166478

[51] Int. Cl.⁶ ............................. B60R 16/02; B60L 1/00
[52] U.S. Cl. ............................................ 701/36; 307/10.1
[58] Field of Search .............................. 701/36; 307/9.1, 307/10.1, 10.8

[56] References Cited

U.S. PATENT DOCUMENTS 5,416,702   5/1995   Kitagawa et al. ................ 364/424.05

FOREIGN PATENT DOCUMENTS 0193485   9/1986   European Pat. Off. .
5-41096    6/1993   Japan .
5-55701    7/1993   Japan .

OTHER PUBLICATIONS

I.E.E Proceedings Section A A I, vol. 129, No. 6, Part E, Nov. 1982, Old Woking, Surrey, GB, pp. 223–228. XP002015112, Preston et al.: "Multiprocessor Implementation of the Logic Function of a Multiplexed Wiring System for Automotives", p. 225, column 1, line 1–p. 226, column 2, line 42; figures 1–5, 8.

Primary Examiner—Michael Zanelli
Attorney, Agent, or Firm—Sughrue, Mion, Zinn, Macpeak & Seas, PLLC

[57] ABSTRACT

A switch operating unit 10 has operating switches for operating loads. A load control unit controls the corresponding loads in accordance with the operation of the operating switches according to information, which is stored in first storage device, as to the correlation between the operating switches and the loads. A total rated capacity computation device computes the total rated capacity of the loads to be driven under the control of the load control unit according to information, which is stored in second storage device, as to the rated capacity of each load. When the total rated capacity exceeds a predetermined allowable capacity, the load control unit operates to restrict the driving of the low-priority loads in the order of analog-controlled loads and on-off controlled loads according to the information stored in the second storage device.

4 Claims, 5 Drawing Sheets

FROM 20b → CPU → TO 20c

- ROM — 20a2
- CPU — 20a1
- RAM — 20a3
- 20a

| | ADDRESS | B7 | B6 | B5 | B4 | B3 | B2 | B1 | B0 |
|---|---|---|---|---|---|---|---|---|---|
| FOR IPS20d1 | ○○H | 0 | 0 | 0 | 0 | 1 | 0 | 1 | 0 |

B7–B5: POSITION INFORMATION OF OPERATING SWITCH
B4–B1: LOAD RATED CAPACITY (0 ~ 15A)
B0: PRIORITY ORDER

「0」 NON-POWER SAVING
「1」 POWER SAVING

LOAD CONTROL SYSTEM FOR VEHICLE

BACKGROUND OF THE INVENTION

1. Field of the Invention

The present invention relates generally to load control systems for vehicles and more particularly to a load control system for a bus vehicle. The system functions to energize a number of corresponding vehicle-borne loads in response to the operation of switches with volumes and on-off switches.

2. Related Art

Various loads such as lamps and motors are generally arranged in numerous parts of a vehicle body and operating switches corresponding to the respective loads are also arranged near the driver's seat, the loads corresponding to the is switches being fixedly set. Therefore, optimum design is adoptable so that current capacity at the time of full-load is allowed.

In the case of electric appliances for use in the body of a bus vehicle, however, variations of switches and loads may be made according to user's designation. Consequently, it tends to become uneconomical in view of cost to build a system of the sort described above to the aforesaid fixed specification.

There has been proposed a load control system intended for solving the cost problem as disclosed in, for example, Japanese Utility Model Laid-Open No. 55701/1993, through the steps of standardizing the hardware configuration of switch input and load output of the system, storing data for designating the correlation between the switch input and the corresponding load output into a memory according to the specification and controlling loads using the data stored in the memory so that greater variations of switches and loads can be dealt with by varying the contents of the memory.

In the proposed system above, the number of load driving outputs and the current capacity of each output have been fixed. However, the current capacity of each output has been set rather large in order to increase freedom against the variations. Notwithstanding, in the case of specification according to which the entire load at full current capacity is connected to the entire output, the total capacity may exceed the allowable current capacity of the system when the entire switch corresponding to these loads is turned on, which is normally unthinkable. This is due to the fact that the system is so designed as to avoid overquality in an attempt to reduce size and cost in consideration of the duty cycle of the current capacity of each output.

SUMMARY OF THE INVENTION

In view of the foregoing problems, an object of the present invention is to provide a load control system for a bus vehicle, which system is capable of properly dealing with over allowable current capacity while avoiding overquality to reduce size and cost.

In order to accomplish the object above according to the present invention, a load control system for a bus vehicle comprises: a switch operating unit having various kinds of operating switches for operating loads installed in a plurality of parts of a bus vehicle, a load control unit for controlling the loads in according with the operation of the operating switches of the switch operating unit, and first storage means for storing information as to defining the correlation between the operating switches of the switch operating unit and the loads, including
second storage means for storing information as to the rated capacity of each load and its priority order and total rated capacity computation means for computing the total rated capacity of the loads driven under the control of the load control unit through the operation of the operating switches from the rated capacity of each load stored in the second storage means, is characterized in that when the total rated capacity computed from the total rated capacity computation means exceeds a predetermined allowable capacity, the switch operating unit operates to restrict the driving of the low-priority load according to the information concerning the priority order stored in the storage means.

The loads include analog-controlled loads and on-off controlled loads and when the total rated capacity computed from the total rated capacity computation means exceeds the predetermined allowable capacity in a case where the low-priority analog-controlled load and the on-off controlled load exist, the load control unit operates to restrict the driving of the analog-controlled load before that of the on-off controlled load is fulfilled according to the information concerning the priority order stored in the storage means.

The load control unit operates to restrict the driving of the load by lowering the duty cycle with respect to the rated capacity of the analog-controlled load.

With the arrangement above and as shown in FIG. 1, the load control unit 20a11 controls the corresponding loads in accordance with the operation of the operating switches of the switch operating unit 10 having the various kinds of switches for operating the loads 30a–30e installed in the plurality of parts of the bus vehicle. During the control operation, since the information, which is stored in the first storage means 20c, as to defining the correlation between the operating switches of the switch operating unit and the loads is utilized, numerous variations can be dealt with by altering the contents of the memory through the steps of standardizing the hardware configuration of the switch input and the load output and storing data conforming to the specification which designates the correlation between the switch input and the load output and the like.

The total rated capacity computation means 20a12 computes the total rated capacity of the loads to be driven under the control of the switch operating unit through the operation of the operating switches from the rated capacity of each load stored in the second storage means 20c2 and when the total rated capacity thus computed exceeds the predetermined allowable capacity, the load control unit operates to restrict the driving of the low-priority load according to the information concerning the priority order stored in the second storage means. In the case of the specification according to which the loads at full current capacity are connected to the entire output, the total rated current capacity never exceeds the allowable capacity even when all the switches corresponding to the loads are totally turned on.

The loads include the analog-controlled loads and the is on-off controlled loads and when the total rated capacity computed from the total rated capacity computation means exceeds the predetermined allowable capacity in a case where the low-priority analog-controlled load and the on-off controlled load exist, -the load control unit operates to restrict the driving of the analog-controlled load before that of the on-off controlled load is fulfilled according to the information concerning the priority order stored in the storage means. Since load control unit operates to restrict the driving of the load by lowering the duty cycle with respect to the rated capacity of the analog-controlled load, the problem of letting the total rated capacity exceed the allowable capacity is made solvable without completely turning off any load.

DETAILED DESCRIPTION OF THE PREFERRED EMBODIMENTS

Figure 1:
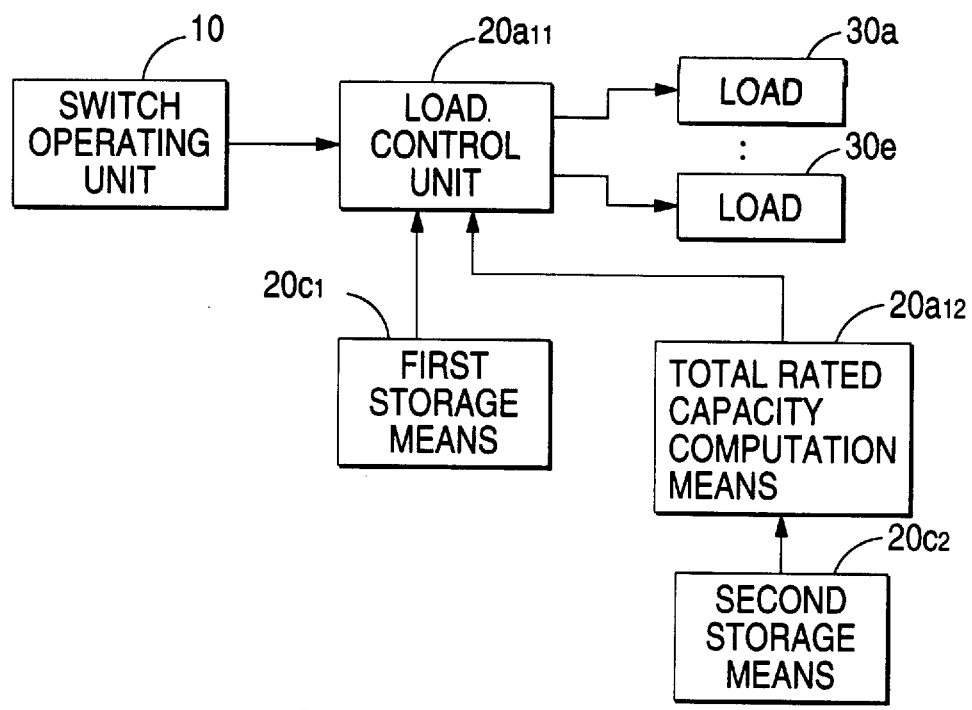
FIG. 1 is diagram illustrating a basic configuration of a load control system for a bus vehicle according to the present invention.
Figure 2:
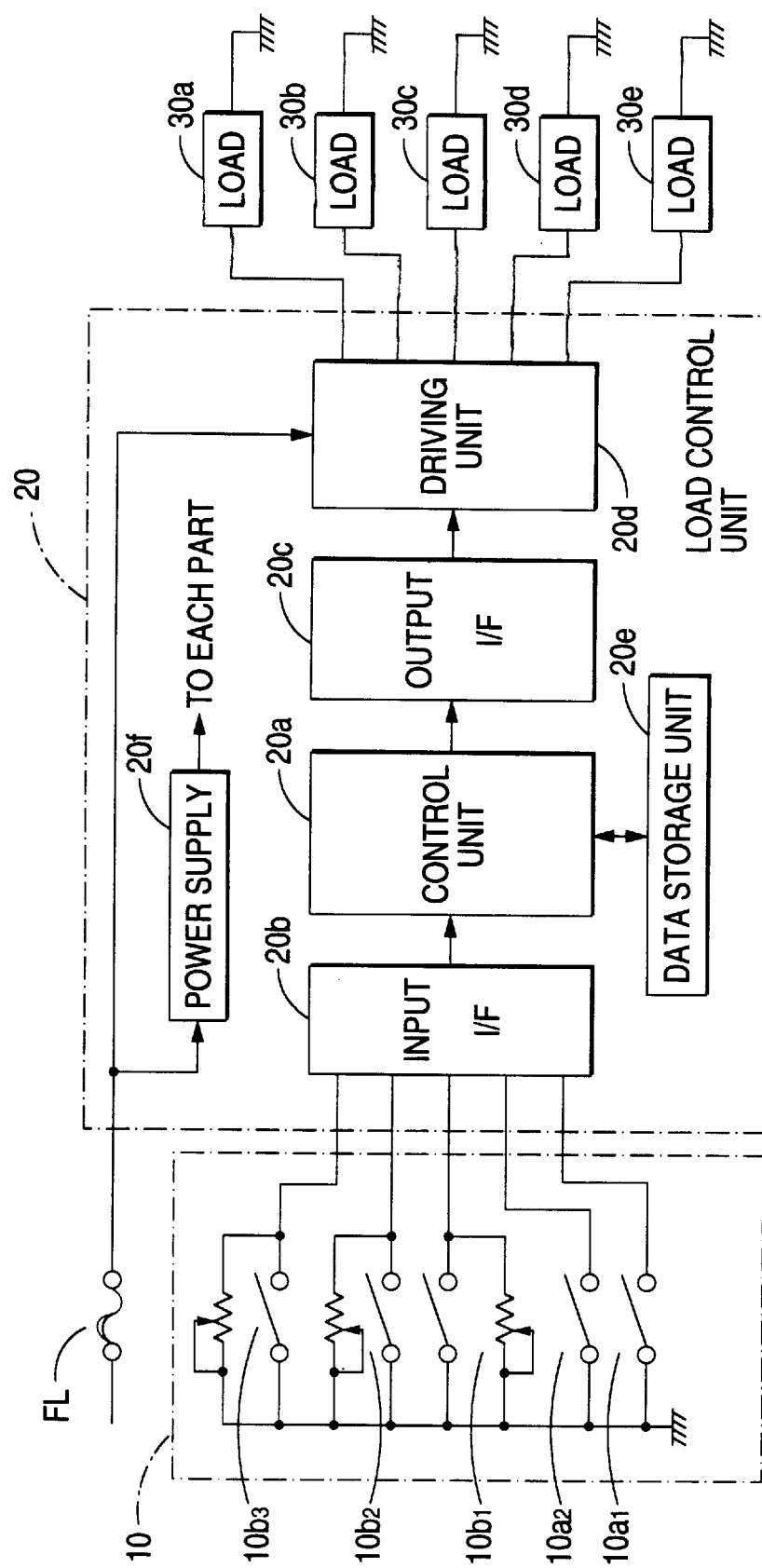
FIG. 2 is a diagram illustrating a load control system for a bus vehicle embodying the present invention.

An embodiment of the present invention will subsequently be described by reference to the accompanying drawings. FIG. 2 is a circuit diagram illustrating a load control system for a bus vehicle embodying the present invention. In FIG. 2, reference numeral 10 denotes a switch operating unit; and 20, a load control unit for controlling loads 30a–30e on receiving switching signals from the switch operating unit 10. The switch operating unit 10 has on-off switches 10a1, 10a2 and switches with volumes 10b1–10b3.

Figures 3, 4:
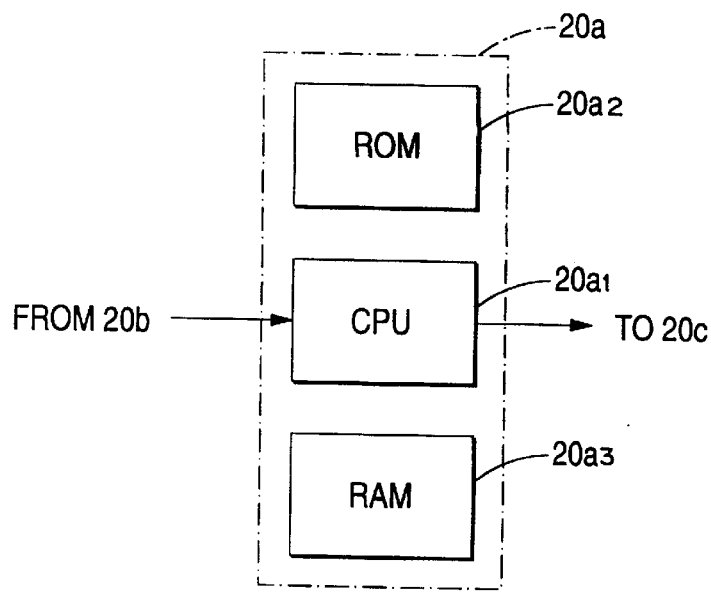
FIG. 3 is an exemplary arrangement of the control unit of FIG. 2.
FIG. 4 is a data structure to be stored in the data storage unit of FIG. 2.

As shown in FIG. 3, the load control unit 20 is provided with a one-chip microcomputer as a control unit 20a incorporating a central processing unit (CPU) 20a1 which operates in accordance with a predetermined control program, a ROM 20a2 for storing various fixed data in addition to the control program, and a RAM 20a3 having a data area for storing various variable data and a work area for use during the operation.

The load control unit 20 also has an input interface (I/F) 20b for inputting switching signals from the switch operating unit 10 to the control unit 20a, an output interface (I/F) 20c for outputting control signals from the control unit 20a, a driving unit 20d for driving loads 30a–30e by controlling supply voltage from a battery mounted in the bus vehicle via a fusible link FL having a predetermined capacity in response to the control signal which is output via the output interface (I/F) 20c, and a data storage unit 20e with a memory for storing data indicative of the correlation between the switch in the switch operating unit 10 and the corresponding load and so forth. Further, 20f denotes a power supply for supplying constant voltage from the battery via the fusible link FL to each part within the load control unit 20.

The control unit 20a sends the control signal to the corresponding load in response to the switching signal received from the switch operating unit 10a and when the control signal is output, the control unit 20a refers to the data indicating the correlation between the switches of the switch operating unit 10 in the data storage unit 20e and the corresponding load. The data storage unit 20e is formed with a memory such as an electrically rewritable E₂PROM which is capable of holding data without a backup power supply. A description will be given of the data to be stored in the memory by reference to a memory map of FIG. 4.

A load output is designated by a memory address in the E₂PROM. Information concerning a switch position for designating a switch in the switch operating unit 10a for operating a load to be connected to the load output designated by the address is stored in high-order bits B7–B5 at that address. The information indicating the correlation between the switch and the load is obtainable from the information on the switch position represented by B7–B5 and the address. Moreover, the rated capacity of the load connected to the load output designated by the memory address is stored in the four bits of B4–B1 at that address. The rated capacity in the range of 0–15A is set by the four bits. The total rated capacity of the load connected to the system can be made known by adding up the rated capacities of the loads connected to the load output. Then the load driving priority order is stored in B0 of the least significant bit 1. The priority is set to [1] in the case of a load to which a power saving (restriction on the power supply) is applied and to [0] in the case of no power saving.

Figure 5:
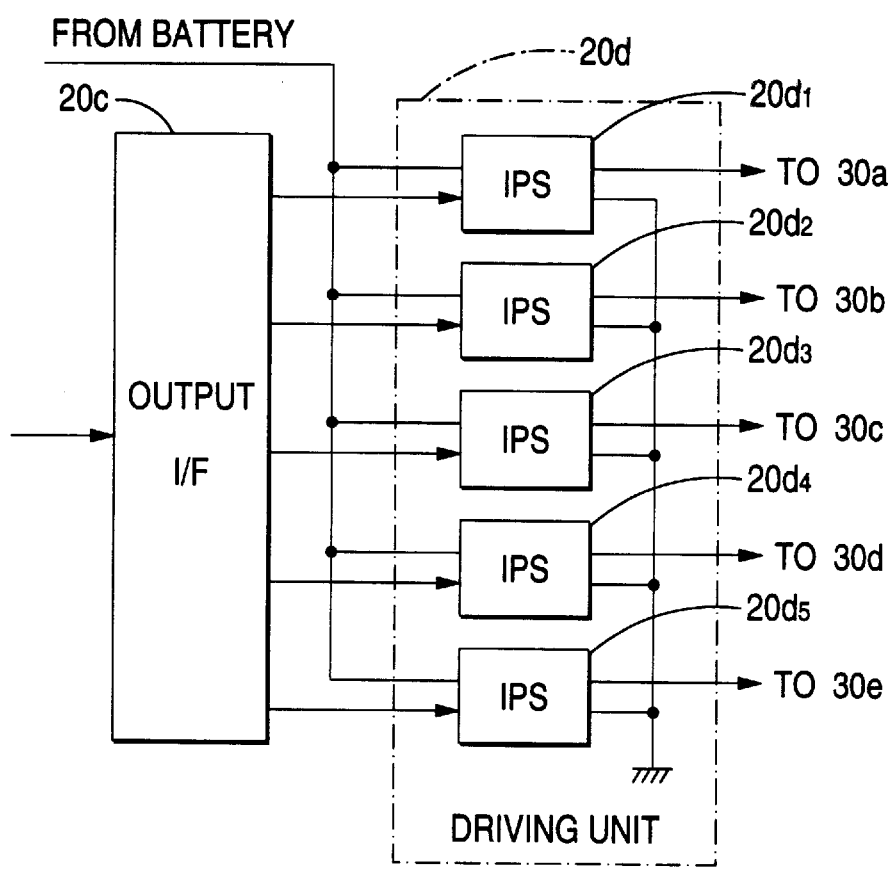
FIG. 5 is an exemplary arrangement of the driving unit of FIG. 2.

As shown in FIG. 5, the driving unit 20d is arranged as, for example, a general-purpose load driving circuit and has IPSs (Intelligent Power Switches) 20d1–20d5 as load output means to which loads 30a–30e are connected, respectively. The control signal that the control unit 20a outputs is input to each IPS via the output interface (I/F) 20c, so that the IPS is turned on/off. In other words, the IPSs function as those which cause the loads 30a–30c respectively connected thereto to be driven and which automatically cut off the circuit on detecting overcurrent flowing as a result of a short in each load. Therefore, a fuse for each load can be dispensed with. Other switching means with control inputs such as relays or transistors may be used to constitute the driving unit 20d.

According to this embodiment of the invention, it is predetermined that on-off controlled loads are connected to the ISPs 20d1–20d2 out of 20d1–20d5, whereas loads to be controlled in an analog form, for example, lighting equipment capable of light modulation are connected to 20d3–20d5.

However, the kind and rated capacity of loads to be connected to the ISPs 20d1–20d5 would greatly vary with customers' specifications. The analog control according to this embodiment of the invention is arranged so that it is effected by making the on-off duty of the IPSs 20d1–20d5 variable.

Although the maximum rated capacities of loads that can be connected to the IPSs 20d1–20d5 are predetermined like, for example, 5A, 5A, 10A, 5A, 5A, a value 30A resulting from adding up these maximum rated capacities is to be set greater than the capacity value, for example, 20A of the fusible link FL. For this reason, the total rated capacity may exceed the allowable capacity of the system determined by the capacity value 20A of the fusible link FL, for example, depending on the specification when all the operating switches are turned on so that the entire load is brought to the functional state. In such a case as this, the power of the loads having low priority is saved by making use of the priority order set to each load so as to decrease the total rated capacity of the loads in operation up to the allowable capacity range.

According to this embodiment of the invention, the loads to which the power-saving has been applied may exist in both domains of the on-off controlled loads and those to be controlled in the analog form because one bit is used only to set the application or non-application of the power-saving with respect to the priority order as stated above according to the aforementioned embodiment of the invention. In this case, the loads to be controlled in the analog form are subjected to the power-saving first. At this time, any load involved is not turned off immediately but reduced to, for example, 50% in terms of the duty cycle with respect to the output rating of the load. In a case where the power-saving is insufficient or where the duty cycle with respect to the output rating of the load involved is in less than 50% from the beginning, any other on-off controlled load with the power-saving is also turned off.

Further, a detailed description will subsequently be given of three specifications taken by way of example by reference to a table 1 below.

Figure 6:
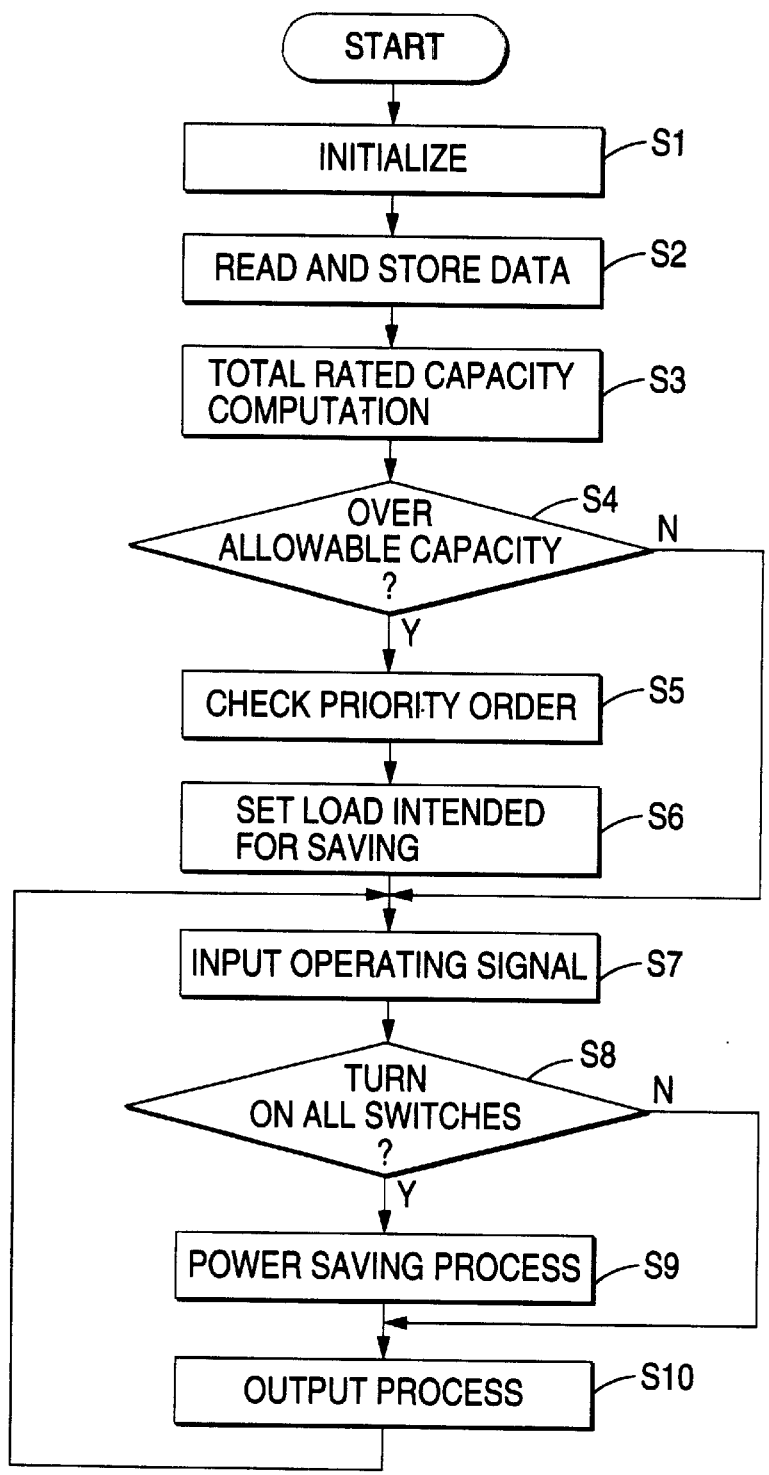
FIG. 6 is a flowchart showing a process to be performed by CPU of FIG. 3 according to a predetermined program.

A detailed description will subsequently be given of the operation as roughly described above by reference to a flowchart of FIG. 6 in which a process is performed by the CPU $20a1$ of the microcomputer constituting the control unit $20a$ according to a predetermined program.

The CPU $20a1$ starts operating when the power supply is put to work, carries out initialization at an initial Step S1, reads the data stored in the data storage unit $20e$ as shown in FIG. 4 and stores the data in the predetermined area of a RAM $20a3$. Then Step S3 is followed wherein the total rated

TABLE 1

| Load output | System configuration Kind of load | Rating | Connected load capacity Spec. 1 | Spec. 2 | Spec. 3 | Load operating priority | Duty cycle to rating Spec. 1 | Spec. 2 | Spec. 3 | At the time of power- saving Spec. 2 | Spec. 3 |
|---|---|---|---|---|---|---|---|---|---|---|---|
| IPS$20d_1$ | Analog | 5 A | 2 A | 5 A | 5 A | A | 40% | 100% | 100% | 100% | 100% |
| IPS$20d_2$ | Analog | 5 A | 3 A | 5 A | 5 A | A | 60% | 100% | 100% | 100% | 100% |
| IPS$20d_3$ | Analog | 10 A | 5 A | 8 A | 5 A | B | 50% | 80% | 50% | 50% | 50% |
| IPS$20d_4$ | On-off | 5 A | 2 A | 2 A | 5 A | A | 40% | 40% | 100% | 40% | 100% |
| IPS$20d_5$ | On-off | 5 A | 3 A | 3 A | 3 A | B | 60% | 60% | 60% | 60% | 0% |
| Total | | 30 A | 15 A | 23 A | 23 A | | 75% | 115% | 115% | 20 A | 20 A |
| Allowable capacity | | 20 A | | Over | Over | | | | | | |

A: Priority is high
B: Priority is low

In the case of the specification 1, first, the rated capacities of loads connectable to IPSE $20d1$–$20d5$ are each 2A, 3A, 5A, 2A and 3A, which are each lower than the maximum rated capacities of the IPSs $20d1$–$20d5$: 5A, 5A, 10A, 5A and 5A. The duty cycles with respect to the ratings are each 40%, 60%, 50%, 40% and 60%, whereas its total rated capacity 15A is less than the allowable capacity 20A. Therefore, the power is not saved despite the leveled-down priority of the IPSs $20d3$ and $20d5$ to which the analog-controlled load and the on-off controlled load are connected, respectively.

In the case of the specification 2, further, the rated capacities of loads connectable to IPSs $20d1$–$20d5$ are each 5A, 5A, 8A, 2A and 3A, which are, needless to say, each lower than the maximum rated capacities of the IPSs $20d1$–$20d5$. In addition, the duty cycles with respect to the ratings are each 100%, 100%, 80%, 40% and 60%, whereby its total rated capacity 23A exceeds the allowable capacity 20A (the duty cycle 115% with respect to the allowable capacity). Therefore, the power needs saving when the entire load is turned on and the duty cycle with respect to the rating of the analog-controlled load connected to the low-priority IPSE $20d3$ is first reduced from 80% to 50%. As a result of the power-saving, the total rated capacity is leveled down to 20A as the allowable capacity even when the entire load is turned on.

In the case of the specification 3, finally, the rated capacities of loads connectable to IPSs $20d1$–$20d5$ are each 5A, 5A, 5A, 5A and 3A, whereas the duty cycles with respect to the ratings are each 100%, 100%, 50%, 100% and 60%, whereby its total rated capacity 23A exceeds the allowable capacity 20A (the duty cycle 115% with respect to the allowable capacity). Therefore, the power needs saving when the entire load is turned on but since the duty cycle with respect to the rating of the analog-controlled load connected to the low-priority IPS $20d3$ has already been brought to 50%, the on-off controlled load connected to the low-priority IPS $20d5$ is turned off likewise in this case. As a result of the power-saving, the total rated capacity is leveled down to 20A as the allowable capacity even when the entire load is turned on.

capacity of the entire connected load on the basis of the data stored in the RAM $20a3$ is computed. Subsequently, Step S4 is followed wherein the total rated capacity computed at Step S3 above is compared with the allowable capacity of the system predetermined in the data area of, for example, a ROM $20a2$, so that it is decided whether the total rated capacity becomes greater than the allowable capacity.

When the decision made at Step S4 is YES, that is, when the total rated capacity is greater than the allowable capacity, Step S5 is followed and priority order is checked by means of the data stored in the RAM $20a3$ at Step S2. Then Step S7 is followed after the load intended for power-saving is set at Step S6 depending on the checked result. When the decision made at Step S4 is NO, Step S7 is directly followed by skipping Step S4 and Step S5.

At Step S7, signals for operating the respective switches of the switch operating unit 10 are input and then Step SB is followed so as to make a decision on whether all the switches are in the ON state. When the decision made at Step 58 is YES, Step S9 is followed and the power-saving process is performed. At the time the power-saving process is performed at Step S9, the load set as a power-saving object at Step S6 is subjected to the power-saving and then Step S10 is followed to perform the outputting process. In case where the decision made at Step S8 is NO, Step S10 is followed by skipping Step S9 to perform the outputting process. After Step S10, Step S7 is followed again to repeat the operations above.

As is obvious from the operations described above, the CPU $20a1$ acts as not only a load control unit $20a11$ for controlling the corresponding loads $30a$–$30e$ in accordance with the operation of the operating switches of the switch operating unit 10 but also a total rated capacity computation means $20a12$ for computing the total rated capacity of the loads to be driven under the control of the load control unit through the operation of the operation switches from the rated capacity of each load stored in the data storage unit $20e$.

When the total rated capacity computed by the total rated capacity computation means $20a12$ exceeds the predetermined allowable capacity, the load control unit 20a11 operates to restrict the driving of the low-priority load according to the information concerning the priority order stored in the data storage unit 20e.

Further, in a case where the low-priority analog-controlled load and the on-off controlled load exist, the load control unit 20a11 operates to restrict the driving of the analog-controlled load before that of the on-off controlled load is fulfilled according to the information concerning the priority order stored in the data storage unit 20e when the total rated capacity computed by the total rated capacity computation means 20a12 exceeds the predetermined allowable capacity likewise.

Further, by lowering the duty cycle with respect to the rated capacity of the analog-controlled load, the load control unit 20a11 also operates to restrict the driving of the load.

In these embodiments, although a specific description is not included, CPU $20a_1$ receives an amount of operating volume of the switches with volume through analog-digital conversion and controls driving of the analog-controlled load on the basis of the amount of operating volume of the switches with volume.

Although control has been exerted so that the utilization factor of the load output remains at 50% at the time of power-saving for restricting the driving of the analog-controlled load according to the aforementioned embodiment of the invention, it may also be exerted to set the factor at 50% of the rated capacity of the load.

As set forth above, since the information as to defining the correlation between the operating switch of the switch operating unit and the load is utilized, numerous variations can be dealt with by varying the contents of the memory through the steps of standardizing the hardware configuration of the switch input and the load output and storing data conforming to the designated specification such as the correlation between the switch input and the load output.

Further, the current capacity of each output has been set rather large in order to increase freedom against the variations, whereupon the total capacity exceeds the allowable capacity when the switches corresponding to the respective loads are totally turned on in the case of specification according to which the entire load at full current capacity is connected to the entire output. However, the total rated capacity of the loads to be driven under control is computed from the rated capacity of the respective loads and when the total rated capacity exceeds the predetermined allowable capacity, the driving of the low-priority load is restricted according to the information concerning the priority order thus stored, whereby the total rated capacity is prevented from exceeding the allowable capacity. Consequently, it is possible to reduce the size and cost of the load control system as overquality is avoided.

When the total rated capacity exceeds the predetermined allowable capacity, the driving of the analog-controlled load is restricted before that of the on-off controlled load is fulfilled and by lowering the duty cycle with respect to the rated capacity of the analog-controlled load in particular, the driving of the load is restricted. Therefore, the problem of letting the total rated capacity exceed the allowable capacity is made solvable without completely turning off any load.

What is claimed is:

1. A load control system for a vehicle comprising:

a switch operating unit having various kinds of operating switches for operating loads installed in a plurality of parts of said vehicle;

a load control unit for controlling the loads in accordance with the operation of the operating switches of said switch operating unit;

first storage means for storing information as to defining the correlation between the operating switches of said switch operating unit and said loads, including second storage means for storing information as to the rated capacity of each load and its priority order and total rated capacity computation means for computing the total rated capacity of said loads driven under the control of said load control unit through the operation of said operating switches from the rated capacity of each load stored in said second storage means, wherein when the total rated capacity computed from said total rated capacity computation means exceeds a predetermined allowable capacity, said load control unit operates to reduce the driving of low-priority loads according to the information concerning priority order stored in said second storage means.

2. A load control system as claimed in claim 1, wherein said loads include analog-controlled loads and on-off controlled loads and wherein when the total rated capacity computed from said total rated capacity computation means exceeds the predetermined allowable capacity in a case where a low-priority analog-controlled load and an on-off controlled load exist, the load control unit operates to reduce the driving of the analog-controlled load before that of the on-off controlled load is fulfilled according to the information concerning the priority order stored in said second storage means.

3. A load control system as claimed in claim 2, wherein said load control unit operates to reduce the driving of the load by lowering the duty cycle with respect to the rated capacity of each of said analog-controlled loads.

4. A load control system as claimed in claim 3, wherein said load control unit further operates to turn off the driving of said on-off controlled loads when either the duty cycle with respect to an output rating of any of said analog-controlled loads is less than a predetermined amount or the computed total rated capacity exceeds the predetermined allowable capacity after the load control unit has reduced the driving of the low priority loads.

* * * * *